United States Patent
Zhu et al.

(10) Patent No.: US 11,282,212 B2
(45) Date of Patent: Mar. 22, 2022

(54) TARGET TRACKING METHOD, DEVICE, ELECTRONIC APPARATUS AND STORAGE MEDIUM

(71) Applicant: Beijing Baidu Netcom Science And Technology Co Ltd, Beijing (CN)

(72) Inventors: Xiaoxing Zhu, Beijing (CN); Yongyi Sun, Beijing (CN); Chengfa Wang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 16/912,193

(22) Filed: Jun. 25, 2020

(65) Prior Publication Data

US 2021/0142489 A1 May 13, 2021

(30) Foreign Application Priority Data

Nov. 13, 2019 (CN) .......................... 201911106568.0

(51) Int. Cl.
*G06T 7/00* (2017.01)
*G06T 7/246* (2017.01)
(Continued)

(52) U.S. Cl.
CPC .......... *G06T 7/246* (2017.01); *G06K 9/00744* (2013.01); *G06K 9/6202* (2013.01);
(Continued)

(58) Field of Classification Search
None
See application file for complete search history.

(56) References Cited

U.S. PATENT DOCUMENTS

| 2019/0080207 A1* | 3/2019 | Chang | G06K 9/723 |
| 2020/0126239 A1* | 4/2020 | Qian  | B64D 47/08 |

(Continued)

FOREIGN PATENT DOCUMENTS

| CN | 108229456 A | 6/2018 |
| CN | 108230353 A | 6/2018 |

OTHER PUBLICATIONS

W/sup 4/: Who? When? Where? What? A real time system for detecting and tracking people. Haritaoglu et al., (Year: 1998).*
(Continued)

*Primary Examiner* — Delomia L Gilliard
(74) *Attorney, Agent, or Firm* — Akerman LLP

(57) ABSTRACT

A target tracking method and device, as well as an electronic apparatus and a storage medium are provided. The method includes: acquiring feature information of a detection box in a current video frame and feature information of a detection box in a previous video frame, the feature information comprising position information of the detection box and an appearance feature of an obstacle target within the detection box, wherein the appearance feature comprises a texture feature and a semantics feature; matching the feature information of the detection box in the current video frame with the feature information of the detection box in the previous video frame; and determining a tracking trajectory of the detection box in the current video frame according to a matching result. In the embodiment of the application, an accuracy for tracking an object can be improved.

18 Claims, 4 Drawing Sheets

(51) Int. Cl.
 G06T 7/73 (2017.01)
 G06K 9/00 (2022.01)
 G06K 9/62 (2022.01)
 G06K 9/72 (2006.01)
 G06N 3/02 (2006.01)
 G06T 7/40 (2017.01)

(52) U.S. Cl.
 CPC ............. *G06K 9/726* (2013.01); *G06N 3/02* (2013.01); *G06T 7/40* (2013.01); *G06T 7/73* (2017.01); *G06T 2207/10016* (2013.01); *G06T 2207/20084* (2013.01); *G06T 2207/30241* (2013.01)

(56) References Cited

U.S. PATENT DOCUMENTS

2020/0363815 A1* 11/2020 Mousavian ........ G06K 9/00805
2020/0380274 A1* 12/2020 Shin .................. G06K 9/00664

OTHER PUBLICATIONS

Tracking with Deep Neural Networks. Jin et al. (Year: 2013).*
Extended European Search Report dated Dec. 11, 2020 issued in connection with corresponding European Patent Application No. 20184261.4.
Haritaoglu et al, "W4: Who? When? Where? What? A real time system for detecting and tracking people," Automatic Face and Gesture Recognition, 1998. Proceedings. Third IEEE International Conference on Nara, Japan Apr. 14-16, 1998, Los Alamitos, CA, USA,IEEE Comput. Soc, US, Apr. 14, 1998 (Apr. 14, 1998), pp. 222-227, XP010277655.
Valtteri et al, "Multi-Object Tracking Using Color, Texture and Motion," Computer Vision and Pattern Recognition, 2007. CVPR '07. IEEE Conference on, Jun. 1, 2007 (Jun. 1, 2007), pp. 1-7, XP055756214.
Jonghoon et al., "Tracking with deep neural networks," 2013 47th Annual Conference on Information Sciences and Systems (CISS), IEEE, Mar. 20, 2013 (Mar. 20, 2013), pp. 1-5, XP032497554.
Notification of First Office Action dated Dec. 27, 2021 issued in connection with corresponding Chinese Patent Application No. 2019111065680.
Search Report dated Dec. 27, 2021 issued in connection with corresponding Chinese Patent Application No. 2019111065680.

* cited by examiner calculating a first distance between the center point of the detection box in the current video frame and the center point of the detection box in the previous video frame, calculating a second distance between each corner point of the detection box in the current video frame and a corresponding corner point of the detection box in the previous video frame, calculating a third distance between the texture feature between the obstacle target in the detection box in the current video frame and the obstacle target in the previous video frame, and calculating a fourth distance between the semantic feature of the obstacle target in the detection box in the current video frame and the obstacle target in the detection box in the previous video frame — S301 calculating the difference degree by using the first distance, the second distance, the third distance, the fourth distance, and weights corresponding to the first distance, the second distance, the third distance, and the fourth distance — S302

FIG. 3

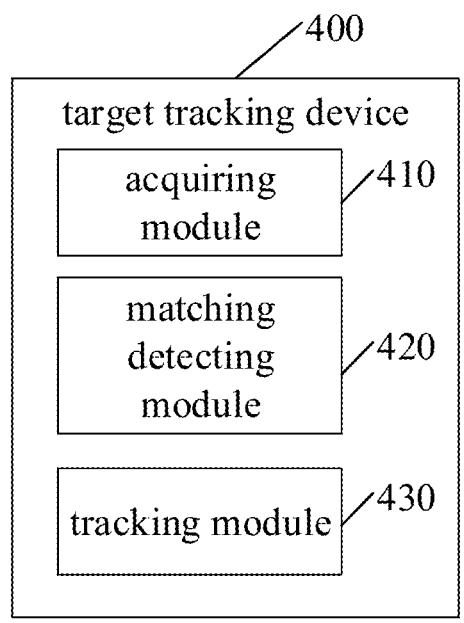

FIG. 4

TARGET TRACKING METHOD, DEVICE, ELECTRONIC APPARATUS AND STORAGE MEDIUM

CROSS-REFERENCE TO RELATED APPLICATION

This application claims priority to Chinese Patent Application No. 201911106568.0, entitled "Target Tracking Method, Device, Electronic Apparatus and Storage Medium", and filed on Nov. 13, 2019, which is hereby incorporated by reference in its entirety.

TECHNICAL FIELD

The present disclosure relates to the field of automatic drive, and in particular, to a target tracking method, device, an electronic apparatus and a storage medium.

BACKGROUND

Tracking is a means to solve the unique identification of an object. A detection box in a video frame can be acquired through a detection process. One obstacle target is included in each detection box. During tracking, a problem to be solved is to determine which detection box in a subsequent video frame has a matching relationship with the detection box in a previous video frame. In a case that there is a matching relationship between a pair of detection boxes in two continuous video frames, it can be determined that the obstacle targets included in the pair of detection boxes are the same one.

In the existing technology, the matching relationship between detection boxes is generally determined based on relatively simple information, resulting in low tracking accuracy. Particularly, in the case that the detection boxes overlap with each other, tracking errors are more likely to occur due to parallax problems.

SUMMARY

A target tracking method and device, as well as an electronic apparatus and a storage medium are provided according to embodiments of the present disclosure.

According to a first aspect, a target tracking method is provided according to an embodiment of the application, including:

acquiring feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

matching the feature information of the detection box in the current video frame with the feature information of the detection box in the previous video frame; and determining a tracking trajectory of the detection box in the current video frame according to a matching result.

In the embodiment of the present application, the matching are performed by using the position information and the appearance feature of the detection box in the current video frame and the previous video frame, and tracking is performed according to the matching result. As the matching is performed simultaneously based on the position information and appearance feature, large amount of data may be used, and an accuracy of the matching is higher, thus improving an accuracy for tracking.

In an implementation, the acquiring the appearance feature of an obstacle target in the detection box includes:

acquiring the appearance feature of the obstacle target using a neural network model, where the texture feature of the obstacle target is acquired by using a low-level part of the neural network model, and the semantic feature of the obstacle target is acquired by using a high-level part of the neural network model.

In the embodiments of the present application, by acquiring the high-level feature and low-level feature of the obstacle target with different levels of the neural network model, it is possible to collect richer appearance features, improve the accuracy of matching, and thereby improve the accuracy of tracking.

In an implementation, the acquiring position information of the detection box includes:

in a case of the detection box in a shape of rectangular, acquiring position information of a center point and four corner points of the detection box.

In the embodiment of the present application, the center point and four corner points are used to locate the detection box, and thus the position of the detection box can be concisely and efficiently located, which is convenient for performing the matching.

In an implementation, the matching the feature information of the detection box in the current video frame with the feature information of the detection box in the previous video frame includes:

calculating a difference degree between the feature information of the detection box in the current video frame and the feature information of the detection box in the previous video frame; and matching the feature information of the detection box in the current video frame with the feature information of the detection box in the previous video frame, by using a preset matching algorithm according to the difference degree.

In the embodiments of the present application, a preset matching algorithm is used for the matching, the matching between the detection boxes can be quickly and accurately implemented.

In an implementation, the difference degree is calculated by:

calculating a first distance between the center point of the detection box in the current video frame and the center point of the detection box in the previous video frame, calculating a second distance between each corner point of the detection box in the current video frame and a corresponding corner point of the detection box in the previous video frame, calculating a third distance between the texture feature between the obstacle target in the detection box in the current video frame and the obstacle target in the previous video frame, and calculating a fourth distance between the semantic feature of the obstacle target in the detection box in the current video frame and the obstacle target in the detection box in the previous video frame; and calculating the difference degree by using the first distance, the second distance, the third distance, the fourth distance, and weights corresponding to the first distance, the second distance, the third distance, and the fourth distance.

In the embodiment of the present application, the distance of each feature in the two detection boxes is calculated, and the distance and the corresponding weight are used to calculate the difference degree between the two detection boxes. As the weight is adjustable, a proportion of each feature can be adjusted when calculating the difference degree.

According to a second aspect, a target tracking method is provided according to an embodiment of the application, including:

an acquiring module configured to acquire feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

a matching detecting module configured to match the feature information of the detection box in the current video frame with the feature information of the detection box in the previous video frame; and a tracking module configured to determine a tracking trajectory of the detection box in the current video frame according to a matching result.

In an implementation, the acquiring module includes:

an appearance feature acquiring sub-module configured to acquire the appearance feature of the obstacle target using a neural network model, wherein the texture feature of the obstacle target is acquired by using a low-level part of the neural network model, and the semantic feature of the obstacle target is acquired by using a high-level part of the neural network model.

In an implementation, the acquiring module includes:

a position information acquiring sub-module configured to, in a case of the detection box in a shape of rectangular, acquire position information of a center point and four corner points of the detection box.

In an implementation, the matching detecting module includes:

a difference degree calculating sub-module configured to calculate a difference degree between the feature information of the detection box in the current video frame and the feature information of the detection box in the previous video frame; and a detecting sub-module configured to match the feature information of the detection box in the current video frame with the feature information of the detection box in the previous video frame, by using a preset matching algorithm according to the difference degree.

In an implementation, the difference degree calculating sub-module is configured to:

calculate a first distance between the center point of the detection box in the current video frame and the center point of the detection box in the previous video frame, calculate a second distance between each corner point of the detection box in the current video frame and a corresponding corner point of the detection box in the previous video frame, calculate a third distance between the texture feature between the obstacle target in the detection box in the current video frame and the obstacle target in the previous video frame, and calculate a fourth distance between the semantic feature of the obstacle target in the detection box in the current video frame and the obstacle target in the detection box in the previous video frame; and calculate the difference degree by using the first distance, the second distance, the third distance, the fourth distance, and weights corresponding to the first distance, the second distance, the third distance, and the fourth distance.

According to a third aspect, an electronic apparatus is provided in an embodiment of the application, includes:

at least one processor; and a memory communicated with the at least one processor, wherein instructions executable by the at least one processor is stored in the memory, and the instructions executed by the at least one processor to enable the at least one processor to implement the methods provided by any one of the embodiments of the present application.

According to a fourth aspect, a non-transitory computer-readable storage medium storing computer instructions is provided in an embodiment of the application, wherein the computer instructions is configured to enable a computer to implement the methods provided by any one of the first aspect in embodiments of the present application.

One embodiment in the above application has the following advantages or beneficial effects. In the embodiments of the present application, the matching are performed by using the position information and the appearance feature of the detection box in the current video frame and the previous video frame, and tracking is performed according to the matching result. As the matching is performed simultaneously based on the position information and appearance feature, a large amount of data can be used, and an accuracy of the matching is higher, thus improving an accuracy for tracking.

Other effects of the foregoing optional manners will be described below in conjunction with specific embodiments.

BRIEF DESCRIPTION OF THE DRAWINGS

The drawings are used to better understand the solution, and do not constitute a limitation on the application among them.

FIG. 3 is a schematic flowchart of an implementation for calculating a difference degree between two detection boxes in a target tracking method according to the present application;

FIG. 4 is a first schematic structural diagram of a target tracking device according to the present application;

DETAILED DESCRIPTION

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for public knowledge of functions and structures are omitted in the following descriptions.

Figure 1:
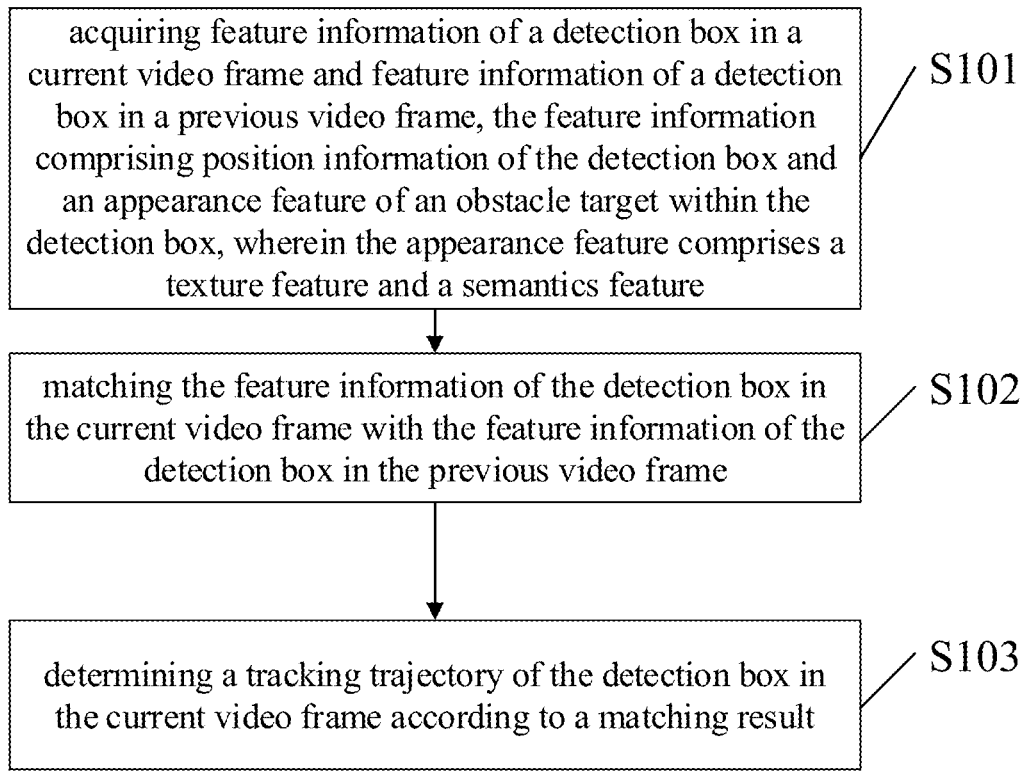
FIG. 1 is a schematic flowchart of an implementation of a target tracking method according to the present application.

A target tracking method is provided in the embodiment of the present application proposes. FIG. 1 is a schematic flowchart of an implementation of a target tracking method according to the present application, including:

S101, acquiring feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

S102, matching the feature information of the detection box in the current video frame with the feature information of the detection box in the previous video frame; and S103, determining a tracking trajectory of the detection box in the current video frame according to a matching result.

In the embodiment of the present application, the matching is performed by using the position information and the appearance feature of the detection box in the current video frame and the previous video frame, and the tracking is performed according to the matching result. As the matching is performed simultaneously based on the position information and appearance feature, a large amount of data is used, and the accuracy of the matching is higher, thus improving the accuracy for the tracking.

In a possible implementation, the current video frame and the previous video frame may refer to two consecutive or adjacent video frames extracted from video data collected by a camera. There may be one or more detection boxes in one video frame. One obstacle target is included in each detection box. The aforementioned obstacle target may refer to a vehicle, a pedestrian, and the like.

In a possible implementation, the matching result includes a matching result or a mismatching result. If the detection box A in the current video frame matches with the detection box A' in the previous video frame, it means that the feature information of the detection box A and the detection box A' is similar, and it can be considered that the obstacle target in the detection box A and the obstacle target in the detection box A' are the same one. In this case, the detection box A in the current video frame can be incorporated into a tracking trajectory in which the detection box A' in the previous video frame is located. If the detection box B in the current video frame does not match with any of the detection boxes in the previous video frame, it means that there is no detection box in the previous video frame similar to the feature information of the detection box B. It can be considered that the obstacle target in the detection box B is an obstacle target that firstly appears in the current video frame. In this case, the detection box B in the current video frame can be used as a starting point of a new tracking trajectory.

In a possible implementation, in S101, the acquiring feature information of a detection box in a current video frame and feature information of a detection box in a previous video frame includes: acquiring the appearance feature of the obstacle target using a neural network model.

Herein, the texture feature of the obstacle target is acquired by using a low-level part of the neural network model, and the semantic feature of the obstacle target is acquired by using a high-level part of the neural network model.

The above neural network model may be a Convolutional Neural Networks (CNN). The neural network model includes multiple layers. In the embodiment of the present application, the texture feature of the obstacle target in the detection box is acquired by using the low-level part of the neural network model, and the semantic feature of the obstacle target in the detection box is acquired by using the high-level part of the neural network model. The texture feature can be considered as a low-level appearance feature of the obstacle target, and the semantic feature can be considered as a high-level appearance feature of the obstacle target. In the embodiment of the present application, the texture feature and semantic feature may be represented by a vector, respectively. In practical applications, different neural network models can be used for different types of obstacle targets, to acquire the appearance feature of the obstacle target. For example, in a case of tracking a vehicle, the appearance feature of the vehicle can be extracted by using a neural network model for vehicle recognition. In a case of tracking a pedestrian, the appearance feature of the pedestrian be extracted by using a neural network model for pedestrian recognition.

In a possible implementation, in S101, acquiring the position information of the detection box includes:

in a case of the detection box in a shape of rectangular, acquiring position information of a center point and four corner points of the detection box.

Figure 2:
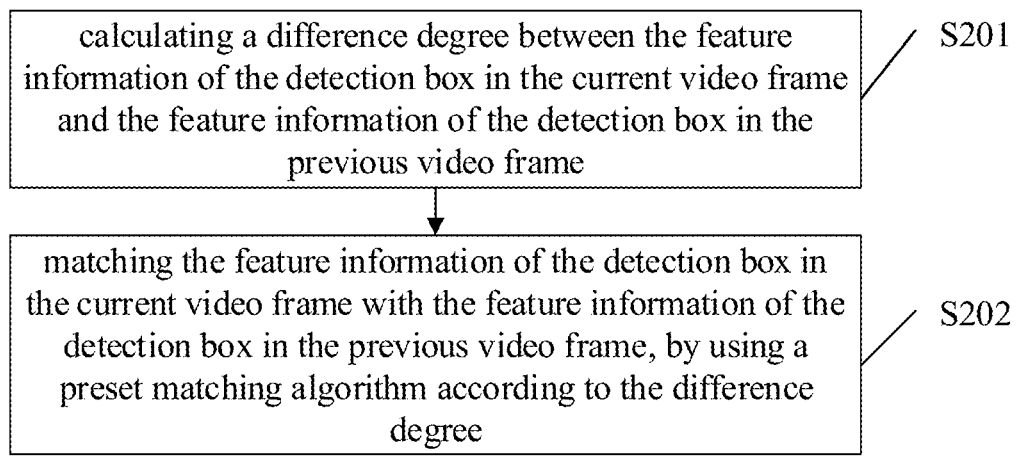
FIG. 2 is a schematic flowchart of the implementation of step S102 in a target tracking method according to the present application.

FIG. 2 is a schematic diagram of an implementation process of S102 in a target tracking method according to the present application, including:

S201, calculating a difference degree between the feature information of the detection box in the current video frame and the feature information of the detection box in the previous video frame; and S202, matching the feature information of the detection box in the current video frame with the feature information of the detection box in the previous video frame, by using a preset matching algorithm according to the difference degree.

In the above S202, in an embodiment of the present application, a bipartite graph matching algorithm, such as a Hungarian algorithm, may be used for the matching.

For example, there are 4 detection boxes in the current video frame, that is, detection box 11, detection box 12, detection box 13, and detection box 14. In the previous video frame, there are 3 detection boxes, that is, detection box 21, detection box 22, and detection box 23.

The calculated difference degrees between detection box 11 and detection box 21, detection box 22, and detection box 23 are D11, D12, and D13, respectively. The calculated differences between detection box 12 and detection box 21, detection box 22, and detection box 23 are D21, D22, D23, respectively. The differences calculated between detection box 13 and detection box 21, detection box 22, and detection box 23 are D31, D32, and D33, respectively. The differences calculated between detection box 14 and detection box 21, detection box 22, and detection box 23 are D41, D42, D43, respectively.

During the matching, one detection box in the current video frame can only match with at most one detection box in the previous video frame. A bipartite graph matching algorithm is used to determine a matching scheme with the smallest sum of the difference degrees.

In the above matching scheme, in a case that no corresponding detection box is assigned to a certain detection box of the current video frame, the matching result of the detection box in the current video frame is the mismatching result. It indicates that the obstacle target in the detection box is a new obstacle target, and a new identification (ID) needs to be assigned to it.

In a case that a corresponding detection box is assigned to a certain detection box of the current video frame, it is also necessary to determine whether the difference between the detection box and the assigned detection box satisfies a threshold condition. If not, it indicates that the difference between the two boxes is too large, the matching result of the detection box in the current video frame is also the mismatching result, and a new identification (ID) needs to be assigned to the detection box. If so, the matching result of the detection box in the current video frame is the matching result, and the detection box in the current video frame can be incorporated to the tracking trajectory in which the matching detection box of this detection box is located.

FIG. 3 is a schematic flowchart of an implementation process for calculating a difference between two detection boxes in a target tracking method according to the present application, including:

S301, calculating a first distance between the center point of the detection box in the current video frame and the center point of the detection box in the previous video frame, calculating a second distance between each corner point of the detection box in the current video frame and a corresponding corner point of the detection box in the previous video frame, calculating a third distance between the texture feature between the obstacle target in the detection box in the current video frame and the obstacle target in the previous video frame, and calculating a fourth distance between the semantic feature of the obstacle target in the detection box in the current video frame and the obstacle target in the detection box in the previous video frame; and S302, calculating the difference degree by using the first distance, the second distance, the third distance, the fourth distance, and weights corresponding to the first distance, the second distance, the third distance, and the fourth distance.

For example, for a detection box X in the current video frame and a detection box Y in the previous video frame, the distance between each feature of the two detection boxes is calculated as follows.

The distance between a center point position of the detection box X and that of the detection box Y is d1.

The distance between an upper left corner point position of the detection box X and that of the detection box Y is d2.

The distance between an upper right corner point position of the detection box X and that of the detection box Y is d3.

The distance between a lower left corner point position of the detection box X and that of the detection box Y is d4.

The distance between a lower right corner point position of the detection box X and that of the detection box Y is d5.

The distance between the texture feature of the obstacle target in the detection box X and that in the detection box Y is d6.

The distance between the semantic feature of the obstacle target in the detection box X and that in the detection box Y is d7.

Herein, the above-mentioned center point position and each corner point position may refer to a coordinate-related position of a corresponding point in the video frame. The above-mentioned d1 to d5 may be calculated geometrically. d2 to d5 constitute the above-mentioned second distance.

Since texture features can be represented by vectors, the above distance d6 between the texture features can be specifically a cosine value of an angle between two vectors for the texture features. The closer the cosine value is to 1, the closer the angle is to 0 degrees, that is, the more the two vectors of the texture feature are similar. Similarly, the distance d7 between the semantic features can also be a cosine value of an angle between two vectors for the semantic features.

After the above distances are calculated, the difference degree between detection box X and detection box Y can be calculated using the following formula.

$$D=w1*d1+w2*d2+w3*d3+w4*d4+w5*d5+w6*d6+w7*d7$$

where w1 to w7 are weights for respective distances.

Each of the above weights can be set and adjusted according to actual situations, so that an importance of each of the above distances can be adjusted when calculating the difference between the detection boxes.

A target tracking device is further provided in the embodiment of the present application. FIG. 4 is a first schematic structural diagram of a target tracking device according to the present application. As shown in FIG. 4, the target tracking device 400 includes:

an acquiring module 410 configured to acquire feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

a matching detecting module 420 configured to match the feature information of the detection box in the current video frame with the feature information of the detection box in the previous video frame; and a tracking module 430 configured to determine a tracking trajectory of the detection box in the current video frame according to a matching result.

Figure 5:
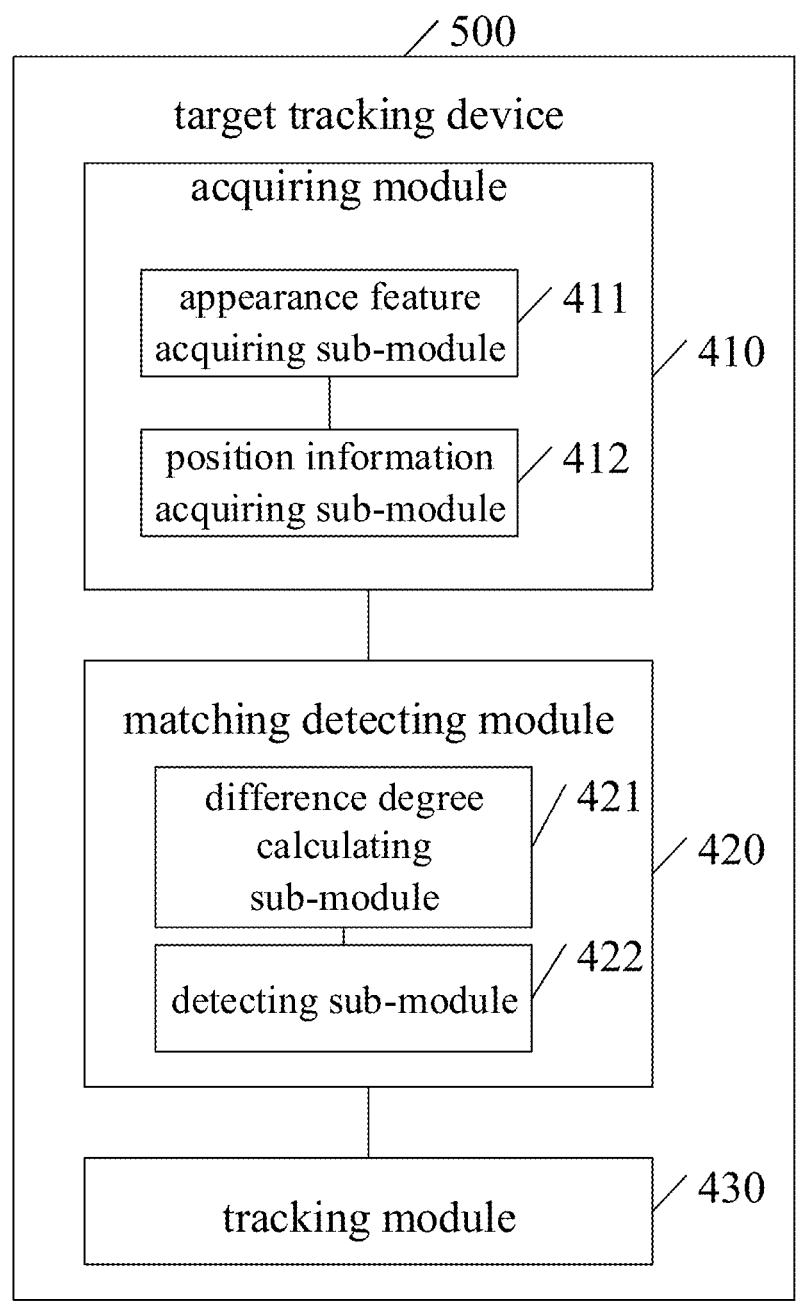
FIG. 5 is a second schematic structural diagram of a target tracking device according to the present application.

A target tracking device is also provided in the embodiment of the present application. FIG. 5 is a second schematic structural diagram of a target tracking device according to the present application. As shown in FIG. 5, the target tracking device 500 includes: the acquiring module 410, the matching detecting module 420, the tracking module 430.

The acquiring module 410 includes:

an appearance feature acquiring sub-module 411 configured to acquire the appearance feature of the obstacle target using a neural network model, wherein the texture feature of the obstacle target is acquired by using a low-level part of the neural network model, and the semantic feature of the obstacle target is acquired by using a high-level part of the neural network model.

The acquiring module 410 further includes:

a position information acquiring sub-module 412 configured to, in a case of the detection box in a shape of rectangular, acquire position information of a center point and four corner points of the detection box.

In an implementation, the matching module 420 includes:

a difference degree calculating sub-module 421 configured to calculate a difference degree between the feature information of the detection box in the current video frame and the feature information of the detection box in the previous video frame; and a detecting sub-module 422 configured to match the feature information of the detection box in the current video frame with the feature information of the detection box in the previous video frame, by using a preset matching algorithm according to the difference degree.

In an implementation, the difference degree calculating sub-module 421 is configured to:

calculate a first distance between the center point of the detection box in the current video frame and the center point of the detection box in the previous video frame, calculate a second distance between each corner point of the detection box in the current video frame and a corresponding corner point of the detection box in the previous video frame, calculate a third distance between the texture feature between the obstacle target in the detection box in the current video frame and the obstacle target in the previous video frame, and calculate a fourth distance between the semantic feature of the obstacle target in the detection box in the current video frame and the obstacle target in the detection box in the previous video frame; and calculate the difference degree by using the first distance, the second distance, the third distance, the fourth distance, and weights corresponding to the first distance, the second distance, the third distance, and the fourth distance.

In this embodiment, functions of units in the content placement device refer to the corresponding description of the above mentioned method and thus the description thereof is omitted herein.

According to an embodiment of the present application, the present application further provides an electronic apparatus and a readable storage medium.

Figure 6:
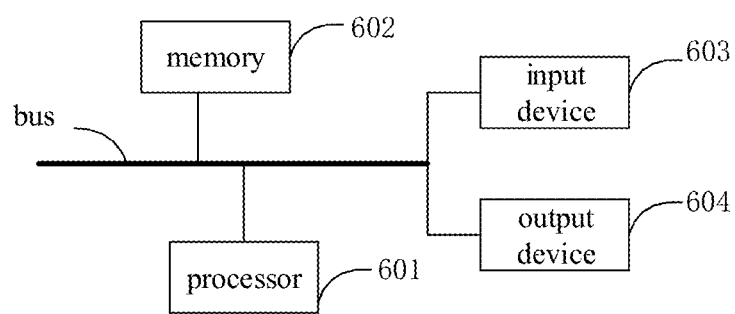
FIG. 6 is a block diagram of an electronic apparatus for implementing the target tracking method in the embodiment of the present application.

As shown in FIG. 6, it is a block diagram of an electronic apparatus according to the content placement method according to the embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital processing, cellular phones, intelligent phones, wearable devices, and other similar computing devices. The components shown here, their connections and relationships, and their functions are merely examples, and are not intended to limit the implementation of the application described and/or required herein.

As shown in FIG. 6, the electronic apparatus includes: one or more processors 601, a memory 602, and interfaces for connecting various components, including a high-speed interface and a low-speed interface. The various components are interconnected using different buses and can be mounted on a common motherboard or otherwise installed as required. The processor may process instructions executed within the electronic apparatus, including storing in or on a memory to display a graphical user interface (GUI) on an external input/output device such as a display device coupled to the interface) Graphic information instructions. In other embodiments, multiple processors and/or multiple buses can be used with multiple memories and multiple memories, if desired. Similarly, multiple electronic apparatus can be connected, each providing some of the necessary operations (for example, as a server array, a group of blade servers, or a multiprocessor system). A processor 601 is taken as an example in FIG. 6.

The memory 602 is a non-transitory computer-readable storage medium provided by the present application. The memory stores instructions executable by at least one processor, so that the at least one processor executes the content placement method provided in the present application. The non-transitory computer-readable storage medium of the present application stores computer instructions, which are used to cause a computer to execute the content placement method provided by the present application.

As a non-transitory computer-readable storage medium, the memory 602 can be used to store non-transitory software programs, non-transitory computer executable programs, and modules, such as program instructions corresponding to the content placement method in the embodiments of the present application. Module/unit (for example, the acquiring module 410, the matching module 420, the tracking module 430 shown in FIG. 4). The processor 601 executes various functional applications and data processing of the server by running non-transitory software programs, instructions, and modules stored in the memory 602, that is, the content placement method in the embodiments of the foregoing method can be implemented.

The memory 602 may include a storage program area and a storage data area, where the storage program area may store an operating system and an application program required for at least one function; the storage data area may store data created according to the use of the electronic device of the content placement method, etc. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely set relative to the processor 601, and these remote memories may be connected to the electronic apparatus with the content placement method through a network. Examples of the above network include, but are not limited to, the Internet, an intranet, a local area network, a mobile communication network, and combinations thereof.

The electronic apparatus with the content placement method may further include an input device 603 and an output device 604. The processor 601, the memory 602, the input device 603, and the output device 604 may be connected through a bus or in other manners. In FIG. 6, the connection through the bus is taken as an example.

The input device 603 can receive inputted numeric or character information, and generate key signal inputs related to user settings and function control of an electronic apparatus for content placement method, such as a touch screen, a keypad, a mouse, a trackpad, a touchpad, a pointing stick, one or more mouse buttons, a trackball, a joystick and other input devices. The output device 604 may include a display device, an auxiliary lighting device (for example, an LED), a haptic feedback device (for example, a vibration motor), and the like. The display device may include, but is not limited to, a liquid crystal display (Liquid Crystal Display, LCD), a light emitting diode (Light Emitting Diode, LED) display, and a plasma display. In some embodiments, the display device may be a touch screen.

Various implementations of the systems and technologies described herein can be implemented in digital electronic circuit systems, integrated circuit systems, application specific integrated circuits (ASICs), a computer hardware, a firmware, a software, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or code) include machine instructions of a programmable processor and can be implemented using high-level procedural and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLD)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a CRT (Cathode Ray Tube) or LCD (liquid crystal display) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a subscriber computer of a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including such background components, middleware components, or any combination of front-end components. The components of the system may be interconnected by any form or medium of digital data communication (such as, a communication network). Examples of communication networks include: a local area network (LAN), a wide area network (WAN), and the Internet.

Computer systems can include clients and servers. The client and server are generally remote from each other and typically interact through a communication network. The client-server relationship is generated by computer programs running on the respective computers and having a client-server relationship with each other.

According to the technical solution of the embodiment of the present application, detect the matching is performed on the detection box by using the position information and the appearance feature of the detection box in the two continuous frames, and tracking is performed according to the result of the matching. As the matching is performed simultaneously based on the position information and appearance feature by using a lot of data, accuracy of the matching is higher. And accuracy for tracking can be improved.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementation manners do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A target tracking method, comprising:
   acquiring feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;
   matching the feature information of the detection box in the current video frame with the feature information of the detection box in the previous video frame; and
   determining a tracking trajectory of the detection box in the current video frame according to a matching result;
   the matching result comprises a successfully matching result or a mismatching result, and the determining the tracking trajectory of the detection box in the current video frame according to the matching result comprises:
   if a first detection box in the current video frame matches with a second detection box in the previous video frame, incorporating the first detection box into a tracking trajectory in which the second detection box is located; and
   if a third detection box in the current video frame does not match with any detection box in the previous video frame, using the third detection box as a starting point of a new tracking trajectory.

2. The target tracking method according to claim 1, wherein the acquiring the feature information of the detection box in the current video frame and the feature information of the detection box in the previous video frame comprises:
   acquiring the appearance feature of the obstacle target using a neural network model,
   wherein, the neural network model comprises multiple layers, the texture feature of the obstacle target is acquired by using a low-level layer of the neural network model, and the semantic feature of the obstacle target is acquired by using a high-level layer of the neural network model.

3. The target tracking method according to claim 2, wherein the acquiring the feature information of the detection box in the current video frame and the feature information of the detection box in the previous video frame comprises:
   in a case of the detection box in a shape of rectangular, acquiring position information of a center point and four corner points of the detection box.

4. The target tracking method according to claim 1, wherein the acquiring the feature information of the detection box in the current video frame and the feature information of the detection box in the previous video frame comprises:
   in a case of the detection box in a shape of rectangular, acquiring position information of a center point and four corner points of the detection box.

5. The target tracking method according to claim 4, wherein the matching the feature information of the detection box in the current video frame with the feature information of the detection box in the previous video frame comprises:

calculating a difference degree between the feature information of the detection box in the current video frame and the feature information of the detection box in the previous video frame; and matching the feature information of the detection box in the current video frame with the feature information of the detection box in the previous video frame, by using a preset matching algorithm according to the difference degree.

6. The target tracking method according to claim 5, wherein the difference degree is calculated by:

calculating a first distance between the center point of the detection box in the current video frame and the center point of the detection box in the previous video frame, calculating a second distance between each corner point of the detection box in the current video frame and a corresponding corner point of the detection box in the previous video frame, calculating a third distance between the texture feature between the obstacle target in the detection box in the current video frame and the obstacle target in the previous video frame, and calculating a fourth distance between the semantic feature of the obstacle target in the detection box in the current video frame and the obstacle target in the detection box in the previous video frame; and calculating the difference degree by using the first distance, the second distance, the third distance, the fourth distance, and preset weights; wherein the preset weights correspond to the first distance, the second distance, the third distance, and the fourth distance, respectively.

7. A target tracking device, comprising:

one or more processors; and a storage device configured for storing one or more programs, wherein the one or more programs are executed by the one or more processors to enable the one or more processors to:

acquire feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

match the feature information of the detection box in the current video frame with the feature information of the detection box in the previous video frame; and determine a tracking trajectory of the detection box in the current video frame according to a matching result;

the matching result comprises a successfully matching result or a mismatching result, and the one or more programs are executed by the one or more processors to enable the one or more processors further to:

if a first detection box in the current video frame matches with a second detection box in the previous video frame, incorporate the first detection box into a tracking trajectory in which the second detection box is located; and if a third detection box in the current video frame does not match with any detection box in the previous video frame, use the third detection box as a starting point of a new tracking trajectory.

8. The target tracking device according to claim 7, wherein the one or more programs are executed by the one or more processors to enable the one or more processors further to:

acquire the appearance feature of the obstacle target using a neural network model, wherein, the neural network model comprises multiple layers, the texture feature of the obstacle target is acquired by using a low-level layer of the neural network model, and the semantic feature of the obstacle target is acquired by using a high-level layer of the neural network model.

9. The target tracking device according to claim 8, wherein the one or more programs are executed by the one or more processors to enable the one or more processors further to:

in a case of the detection box in a shape of rectangular, acquire position information of a center point and four corner points of the detection box.

10. The target tracking device according to claim 7, wherein the one or more programs are executed by the one or more processors to enable the one or more processors further to:

in a case of the detection box in a shape of rectangular, acquire position information of a center point and four corner points of the detection box.

11. The target tracking device according to claim 10, wherein the one or more programs are executed by the one or more processors to enable the one or more processors further to:

calculate a difference degree between the feature information of the detection box in the current video frame and the feature information of the detection box in the previous video frame; and match the feature information of the detection box in the current video frame with the feature information of the detection box in the previous video frame, by using a preset matching algorithm according to the difference degree.

12. The target tracking device according to claim 11, wherein the one or more programs are executed by the one or more processors to enable the one or more processors further to:

calculate a first distance between the center point of the detection box in the current video frame and the center point of the detection box in the previous video frame, calculate a second distance between each corner point of the detection box in the current video frame and a corresponding corner point of the detection box in the previous video frame, calculate a third distance between the texture feature between the obstacle target in the detection box in the current video frame and the obstacle target in the previous video frame, and calculate a fourth distance between the semantic feature of the obstacle target in the detection box in the current video frame and the obstacle target in the detection box in the previous video frame; and calculate the difference degree by using the first distance, the second distance, the third distance, the fourth distance, and preset weights; wherein the preset weights correspond to the first distance, the second distance, the third distance, and the fourth distance, respectively.

13. A non-transitory computer-readable storage medium storing computer instructions, wherein the computer instructions, when executed by a computer, cause the computer to perform operations comprising:

acquiring feature information of a detection box in a current video frame and feature information of a detection box in a previous video frame, the feature information comprising position information of the detection box and an appearance feature of an obstacle target within the detection box, wherein the appearance feature comprises a texture feature and a semantics feature;

matching the feature information of the detection box in the current video frame with the feature information of the detection box in the previous video frame; and determining a tracking trajectory of the detection box in the current video frame according to a matching result;

the matching result comprises a successfully matching result or a mismatching result, and the computer executable instructions, when executed by a processor, cause the processor to perform further operations comprising:

if a first detection box in the current video frame matches with a second detection box in the previous video frame, incorporating the first detection box into a tracking trajectory in which the second detection box is located; and if a third detection box in the current video frame does not match with any detection box in the previous video frame, using the third detection box as a starting point of a new tracking trajectory.

14. The non-transitory computer-readable storage medium of claim 13, wherein the computer executable instructions, when executed by a processor, cause the processor to perform further operations comprising:

acquiring the appearance feature of the obstacle target using a neural network model, wherein, the neural network model comprises multiple layers, the texture feature of the obstacle target is acquired by using a low-level layer of the neural network model, and the semantic feature of the obstacle target is acquired by using a high-level layer of the neural network model.

15. The non-transitory computer-readable storage medium of claim 14, wherein the computer executable instructions, when executed by a processor, cause the processor to perform further operations comprising:

in a case of the detection box in a shape of rectangular, acquiring position information of a center point and four corner points of the detection box.

16. The non-transitory computer-readable storage medium of claim 13, wherein the computer executable instructions, when executed by a processor, cause the processor to perform further operations comprising:

in a case of the detection box in a shape of rectangular, acquiring position information of a center point and four corner points of the detection box.

17. The non-transitory computer-readable storage medium of claim 16, wherein the computer executable instructions, when executed by a processor, cause the processor to perform further operations comprising:

calculating a difference degree between the feature information of the detection box in the current video frame and the feature information of the detection box in the previous video frame; and matching the feature information of the detection box in the current video frame with the feature information of the detection box in the previous video frame, by using a preset matching algorithm according to the difference degree.

18. The non-transitory computer-readable storage medium of claim 17, wherein the computer executable instructions, when executed by a processor, cause the processor to perform further operations comprising:

calculating a first distance between the center point of the detection box in the current video frame and the center point of the detection box in the previous video frame, calculating a second distance between each corner point of the detection box in the current video frame and a corresponding corner point of the detection box in the previous video frame, calculating a third distance between the texture feature between the obstacle target in the detection box in the current video frame and the obstacle target in the previous video frame, and calculating a fourth distance between the semantic feature of the obstacle target in the detection box in the current video frame and the obstacle target in the detection box in the previous video frame; and calculating the difference degree by using the first distance, the second distance, the third distance, the fourth distance, and preset weights; wherein the preset weights correspond to the first distance, the second distance, the third distance, and the fourth distance, respectively.

* * * * *